United States Patent
Kitora et al.

(10) Patent No.: US 11,411,454 B2
(45) Date of Patent: Aug. 9, 2022

(54) ROTARY ELECTRIC MACHINE

(71) Applicant: Mitsubishi Electric Corporation, Tokyo (JP)

(72) Inventors: Ryuichi Kitora, Tokyo (JP); Masaya Inoue, Tokyo (JP); Ryuji Kitamura, Tokyo (JP); Kota Katsuragi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 912 days.

(21) Appl. No.: 16/096,389

(22) PCT Filed: Jun. 8, 2016

(86) PCT No.: PCT/JP2016/067061
§ 371 (c)(1),
(2) Date: Oct. 25, 2018

(87) PCT Pub. No.: WO2017/212574
PCT Pub. Date: Dec. 14, 2017

(65) Prior Publication Data
US 2019/0140509 A1 May 9, 2019

(51) Int. Cl.
*H02K 3/28* (2006.01)
*H02K 3/50* (2006.01)
(Continued)

(52) U.S. Cl.
CPC ........... *H02K 3/522* (2013.01); *H02K 1/185* (2013.01); *H02K 3/50* (2013.01); *H02K 3/52* (2013.01);
(Continued)

(58) Field of Classification Search
CPC ........... H02K 3/50; H02K 3/52; H02K 3/522; H02K 3/28; H02K 5/22; H02K 5/225;
(Continued)

(56) References Cited

U.S. PATENT DOCUMENTS

| 7,595,572 B2 * | 9/2009 | Haga | H02K 3/522 |
| | | | 310/194 |
| 7,663,287 B2 * | 2/2010 | Haga | H02K 3/522 |
| | | | 310/260 |

(Continued)

FOREIGN PATENT DOCUMENTS

| CN | 204578313 U | * | 8/2015 | |
| JP | 2005130665 A | * | 5/2005 | ............... H02K 3/02 |

(Continued)

OTHER PUBLICATIONS

International Search Report for PCT/JP2016/067061 dated Sep. 13, 2016.

*Primary Examiner* — Edgardo San Martin
(74) *Attorney, Agent, or Firm* — Sughrue Mion, PLLC; Richard C. Turner (57) ABSTRACT

In a rotary electric machine, each of coils includes coil terminals led out from a coil main body. The coil terminals are connected to bus bars. When a diameter of each of the bus bars is defined as D, a diameter of a cross section of a coil wire is defined as "d", a Young's modulus of the coil wire is defined as E, a linear expansion coefficient of a material of the bus bars is defined as $\alpha 1$, a linear expansion coefficient of a material of a stator core is defined as $\alpha 2$, and an estimated temperature difference between a room temperature and a use environment temperature is defined as $\Delta T$, a length L of at least one of the coil terminals from an end on the coil main body side to a connecting portion to the bus bar satisfies the following expression:

$$L \geq ((3\pi dED(\alpha 1-\alpha 2)\Delta T/10)^{1/2}/10.$$

14 Claims, 10 Drawing Sheets

(51) Int. Cl.
*H02K 15/02* (2006.01)
*H02K 3/52* (2006.01)
*H02K 1/18* (2006.01)
H02K 5/22 (2006.01)

(52) U.S. Cl.
CPC ......... *H02K 5/225* (2013.01); *H02K 2203/09* (2013.01)

(58) Field of Classification Search
CPC ............... H02K 15/02; H02K 15/0056; H02K 15/0062; H02K 1/185; H02K 2203/09
See application file for complete search history.

(56) References Cited

U.S. PATENT DOCUMENTS

| | | | |
|---|---|---|---|
| 8,482,172 B2* | 7/2013 | Sasaki | H02K 3/522 |
| | | | 310/71 |
| 9,325,213 B2* | 4/2016 | Egami | H02K 3/50 |
| 9,419,491 B2* | 8/2016 | Egami | H02K 3/12 |
| 9,425,665 B2* | 8/2016 | Goto | H02K 3/28 |
| 9,577,498 B2* | 2/2017 | Isoda | H02K 15/0407 |
| 10,008,900 B2* | 6/2018 | Bessho | H02K 1/12 |
| 10,193,405 B2* | 1/2019 | Ohashi | H02K 3/522 |
| 10,587,058 B2* | 3/2020 | Kurono | H02K 3/50 |
| 10,770,944 B2* | 9/2020 | Totsuka | H02K 3/18 |
| 2009/0108688 A1* | 4/2009 | Miura | B60L 3/0061 |
| | | | 310/71 |
| 2010/0201212 A1* | 8/2010 | Urano | H02K 3/522 |
| | | | 310/71 |
| 2011/0232076 A1 | 9/2011 | Matsubara et al. | |
| 2015/0357877 A1 | 12/2015 | Bessho et al. | |
| 2019/0348885 A1* | 11/2019 | Hattori | H02K 3/38 |
| 2021/0194309 A1* | 6/2021 | Okamura | H02K 15/0056 |

FOREIGN PATENT DOCUMENTS

| | | | | |
|---|---|---|---|---|
| JP | 2010-110160 A | 5/2010 | | |
| JP | 2010-213493 A | 9/2010 | | |
| JP | 2011-205836 A | 10/2011 | | |
| JP | 4952111 B2 | 6/2012 | | |
| JP | 5016969 B2 | 9/2012 | | |
| JP | 2014057403 A * | 3/2014 | ............ | H02K 3/28 |
| JP | WO2016157410 A1 * | 6/2017 | ............ | H02K 3/522 |
| JP | 2017200268 A * | 11/2017 | | |
| WO | 2014/174666 A1 | 10/2014 | | |

* cited by examiner

ROTARY ELECTRIC MACHINE

CROSS REFERENCE TO RELATED APPLICATIONS

This application is a National Stage of International Application No. PCT/JP2016/067061 filed Jun. 8, 2016.

TECHNICAL FIELD

The present invention relates to a rotary electric machine having a structure in which coil terminals of a plurality of coils provided to a stator are connected to a plurality of bus bars.

BACKGROUND ART

In general, an on-vehicle rotary electric machine is mounted in a vicinity of an engine, and hence a temperature environment is severe. In order to obtain high output, relaxation of stress generated by thermal deformation of coils and bus bars, each being a heat generating member, is a task to be achieved. To address the task, in a related-art rotary electric machine, coil terminals are linearly coupled to bus bar portions (see, for example, Patent Literature 1).

CITATION LIST

Patent Literature

[PTL 1] JP 5016969 B2

SUMMARY OF INVENTION

Technical Problem

In the related-art rotary electric machine disclosed in Patent Literature 1, the coil terminals are linearly coupled to the bus bar portions. Accordingly, the stress is likely to be generated in coupling portions between the coils and bus bars.

The present invention has been made to solve the problems described above, and has an object to provide a rotary electric machine capable of reducing a stress to be generated in joint portions between the coil terminals and the bus bars due to a temperature rise.

Solution to Problem

A rotary electric machine according to one embodiment of the present invention includes: a frame made of a metal material; a stator core having a cylindrical shape, which is fixed to the frame, and has a plurality of teeth; a plurality of insulators made of an insulating material, which are provided to end surfaces of the stator core; a plurality of coils, each being formed of a coil wire and including a coil main body provided around the tooth via the insulators and coil terminals led out from the coil main body; a plurality of bus bars made of a conductive material, which are provided along a circumferential direction of the stator core, and to which the coil terminals are connected; a holder, which is arranged on a radially outer side of the stator core with respect to the coil terminals, and is configured to hold the plurality of bus bars, wherein, when a diameter of each of the plurality of bus bars is defined as D, a diameter of a cross section of each of the coil wires is defined as "d", a Young's modulus of the coil wires is defined as E, a linear expansion coefficient of the conductive material of the bus bars is defined as $\alpha 1$, a linear expansion coefficient of a material of the stator core is defined as $\alpha 2$, and an estimated temperature difference between a room temperature and a use environment temperature is defined as $\Delta T$, a length L of at least one of the coil terminals from an end on the coil main body side to a connecting portion to the bus bar satisfies the following expression:

$$L \geq ((3\pi dED(\alpha 1 - \alpha 2)\Delta T/10)^{1/2}/10$$

so that a stress generated in the coils due to thermal deformation becomes 250 MPa or less, which corresponds to a 0.2% proof strength.

In addition, a rotary electric machine according to one embodiment of the present invention includes a frame made of a metal material; a stator core having a cylindrical shape, which is fixed to the frame, and has a plurality of teeth; a plurality of insulators made of an insulating material, which are provided to end surfaces of the stator core; a plurality of coils, each being formed of a coil wire and including a coil main body provided around the tooth via the insulators and coil terminals led out from the coil main body; a plurality of bus bars made of a conductive material, which are provided along a circumferential direction of the stator core, and to which the coil terminals are connected; a holder, which is arranged on a radially outer side of the stator core with respect to the coil terminals, and is configured to hold the plurality of bus bars, wherein at least one of the coil terminals includes: a lead-out portion formed to extend from an end of the at least one coil terminal on the coil main body side toward a radially outer side of the stator core; a first linear portion formed along a circumferential direction of the stator core; a first bent portion formed between the lead-out portion and the first linear portion; a second linear portion formed along an axial direction of the stator core; and a second bent portion formed between the first linear portion and the second linear portion.

Advantageous Effects of Invention

The rotary electric machine according to the present invention can reduce the stress to be generated in the connecting portions of the coil terminals to the bus bars due to a temperature rise.

DESCRIPTION OF EMBODIMENTS

Embodiments for carrying out the present invention are now described with reference to the drawings.

First Embodiment

Figure 1:
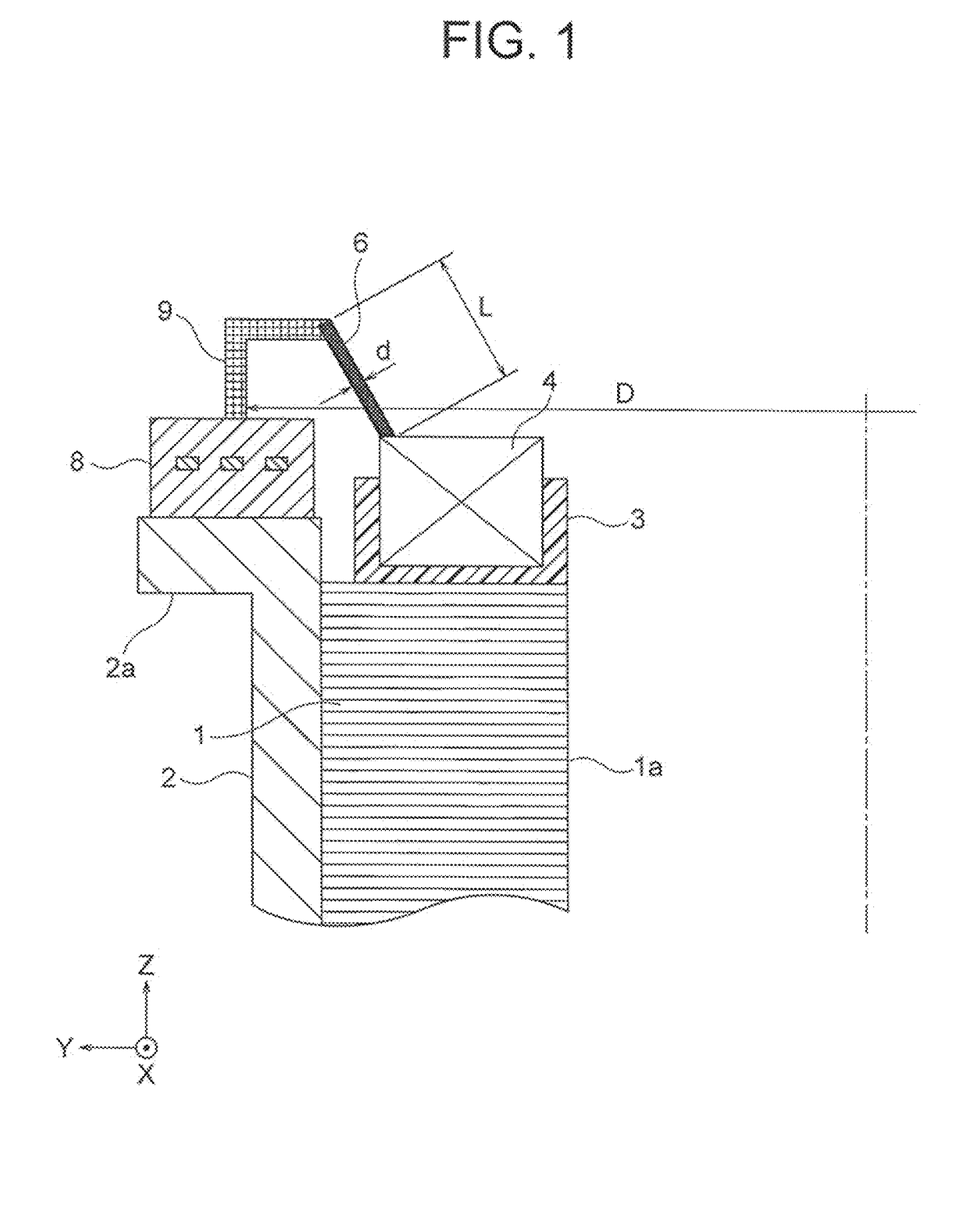
FIG. 1 is a sectional view of a main part of a stator of a rotary electric machine according to a first embodiment of the present invention.
Figure 2:
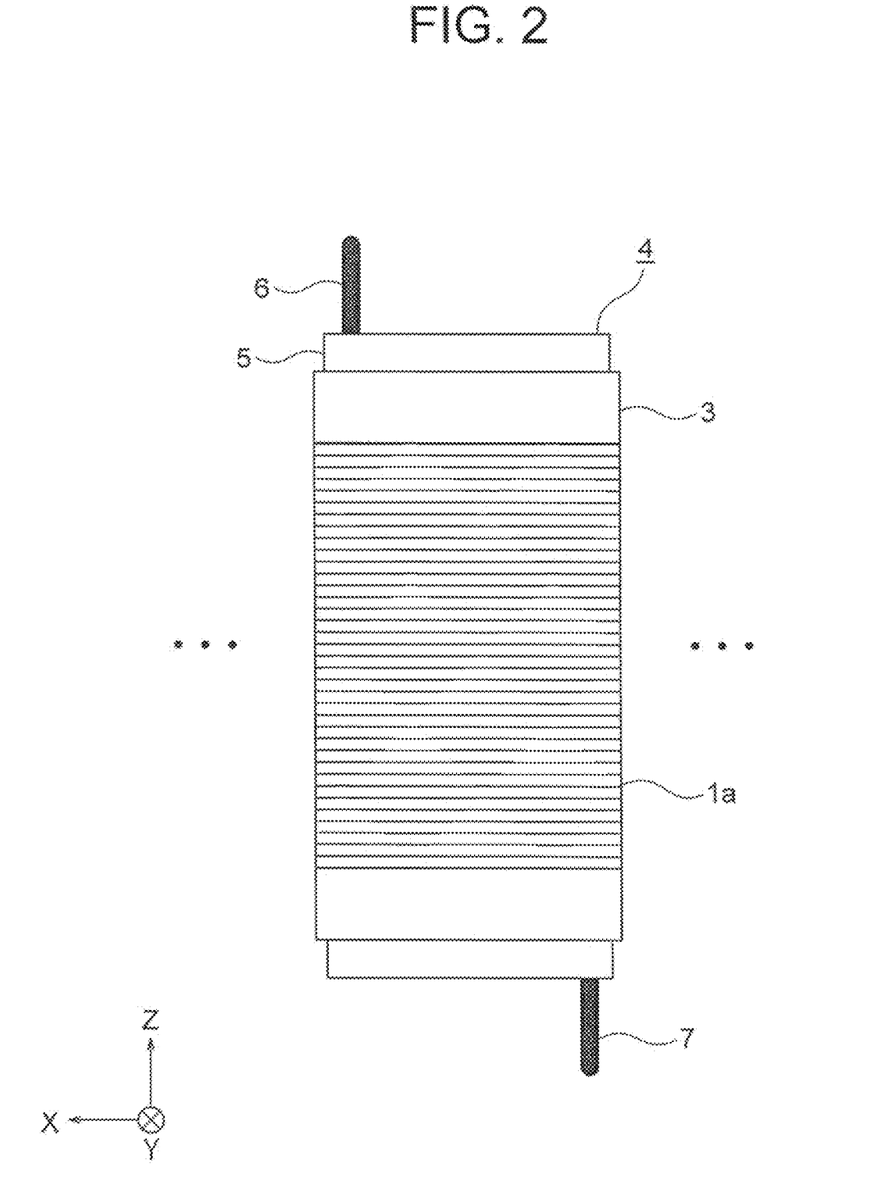
FIG. 2 is a front view when part of the stator of FIG. 1 is viewed outward from a radially inner side.
Figure 3:
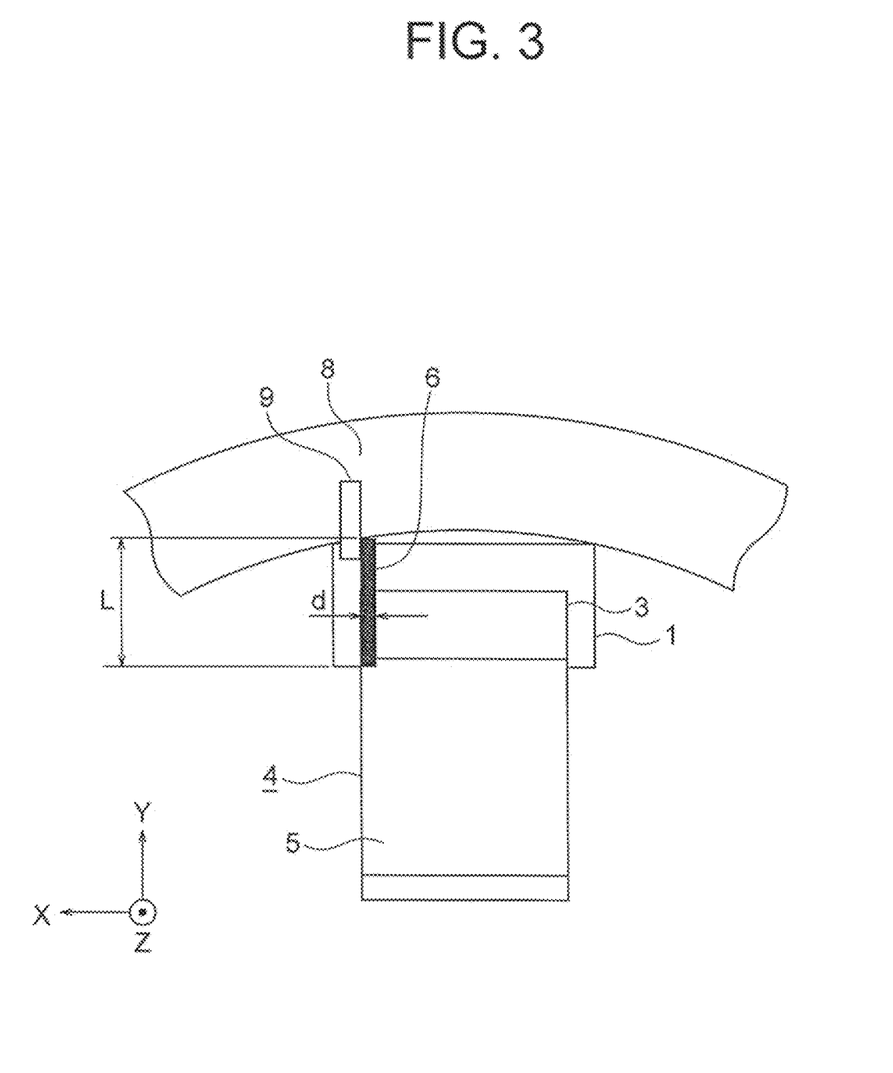
FIG. 3 is a plan view when part of the stator of FIG. 1 is viewed along an axial direction of the stator.

FIG. 1 is a sectional view of a main part of a stator of a rotary electric machine according to a first embodiment of the present invention. A Z-axis direction of FIG. 1 is an axial direction of the stator, whereas a Y-axis direction is a radial direction of the stator. FIG. 2 is a front view when part of the stator of FIG. 1 is viewed outward from a radially inner side. FIG. 3 is a plan view when part of the stator of FIG. 1 is viewed along the axial direction. In the first embodiment, an on-vehicle motor is described as the rotary electric machine.

A stator core 1, which is made of iron and has a cylindrical shape, is fixed to and retained on an inner side of a frame 2, which is made of a metal material, for example, iron, and has a cylindrical shape. At both axial ends of the frame 2, flange portions 2a that project radially outward are provided.

The stator core 1 has a plurality of teeth 1a that project radially inward. The teeth 1a each are provided at equal intervals in a circumferential direction of the stator core 1. On both axial end surfaces of the stator core 1, a plurality of insulators 3 made of an insulating material are provided.

A plurality of coils 4, each being formed of a coil wire, are provided to the stator core 1. Each of the coils 4 includes a coil main body 5, a first coil terminal 6, and a second coil terminal 7. The coil main body 5 is provided around the corresponding tooth 1a via the insulators 3. The first coil terminal 6 and the second coil terminal 7 are led out from the coil main body 5.

The first coil terminal 6 is led out from any one of a winding start and a winding end of the coil main body 5. The second coil terminal 7 is led out from another of the winding start and the winding end of the coil main body 5.

The first coil terminals 6 of all the coils 4 are arranged on the same axial side of the stator core 1. The second coil terminals 7 of all the coils 4 are arranged opposite to the first coil terminals 6 in an axial direction of the stator core 1d.

A holder 8 made of an electrically insulating material is fixed to both axial end surfaces of the frame 2. The holder 8 is arranged on a radially outer side of the stator core 1 with respect to the first coil terminals 6 and the second coil terminals 7.

A plurality of bus bars 9, which are made of a conductive material, for example, copper, and are configured to connect the coils 4 to a power feed unit, are held in the holder 8. The corresponding coil terminals 6 and 7 are connected to the bus bars 9. Each of the coil terminals 6 and 7 is connected to the bus bar 9 of a corresponding phase by, for example, welding, that is, via welded portions. The bus bars 9 are fixed integrally to the holder or accommodated integrally in the holder 8. Further, the bus bars 9 are arranged along the circumferential direction of the stator core 1.

Figure 4:
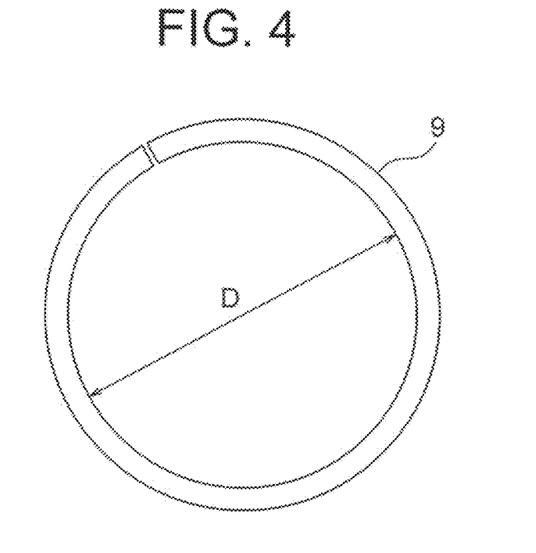
FIG. 4 is a plan view when one of bus bars of FIG. 1 is viewed along the axial direction.
Figure 5:
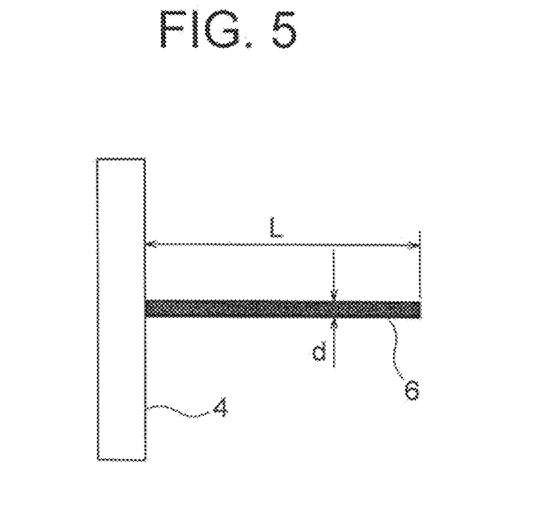
FIG. 5 is an explanatory diagram for illustrating a model obtained by simplifying a first coil terminal of FIG. 1.

Here, a diameter of each of the bus bars 9 as viewed along the axial direction of the stator core 1 is defined as D (see FIG. 4), a diameter of a cross section of the coil wire that forms each of the coils 4 is defined as "d", a Young's modulus of the coil wires is defined as E, a linear expansion coefficient of the material of the bus bars 9 is defined as α1, a linear expansion coefficient of the material of the stator core 1 is defined as α2, and an estimated temperature difference between a room temperature and a use environment temperature is defined as ΔT. In this case, a length L of each of the coil terminals 6 and 7 (see FIG. 5 for a relationship between L and d) from an end on the coil main body 5 side to a connecting portion to the bus bar 9 satisfies the following expression so that a stress generated in the coils due to thermal deformation becomes 250 MPa of less, which corresponds to a 0.2% proof strength.

$$L \geq ((3\pi dED(\alpha 1-\alpha 2)\Delta T/10)^{1/2})/10 \qquad \text{Expression 1}$$

More specifically, the end portion of each of the coil terminals 6 and 7 on the coil main body 5 side is a final fastening point of each of the coil terminals 6 and 7 to the coil main body 5. The diameter D of each of the bus bars 9 is 290 mm or more and 316 mm or less. Further, the diameter d of the cross section of the coil wire is 1.7 mm of more and 2.0 mm or less.

In a case in which forced displacement is caused by a difference in displacement generated between the bus bars 9, each having an approximately annular shape, and the stator core 1 due to a difference in linear expansion coefficient when the estimated temperature difference ΔT between the room temperature and the use environment temperature is generated, a stress to be generated in a beam is generally expressed by the following expression:

$$3\pi dED(\alpha 1-\alpha 2)\Delta T/(4L^2)$$

In this embodiment, L has such a characteristic that the stress to be generated in the beam becomes 250 MPa or less.

For example, in a case in which the material of the bus bars 9 is copper, the material of the stator core 1 is iron, the diameter "d" of the cross section of each of the coil wires is 2 mm, and the diameter D of each of the bus bars 9 is 316 mm in the rotary electric machine, when it is estimated that ΔT is 100 degrees Celsius, E is 122,600, α1 is $1.7 \times 10^{-5}$, and α2 is $1.2 \times 10^{-5}$, the length L of each of the coil terminals 6 and 7 is 19.2 mm or more.

Besides, in a case in which the rotary electric machine is installed in the vicinity of an engine, when a density of each of the coils 4 is defined as ρ, an estimated maximum revolution speed of the engine installed in the vicinity is referred to as R, the number of cylinders of the engine is defined as "a", an order of a vibration mode that is supposed to appear when the rotary electric machine resonates with the engine is defined as "n". In this case, the above-mentioned length L satisfies the following expression.

$$(5.28 \times 10^7 d((E/\rho)^{1/2})/Ran\pi)^{1/2} \geq L \qquad \text{Expression 2}$$

In general, a resonant frequency "f" to be generated in the beam is obtained by the following expression:

$$3.52/2\pi((10^{12} \times Ed^2)/(16\rho L^4))^{1/2}$$

Further, in general, a vibration frequency to be generated from the engine is obtained by the following expression:

$$R \times (1/60) \times a \times (1/2) \times n$$

This embodiment is characteristic in that L is set so that the resonant frequency to be generated in the beam becomes larger than or equal to the vibration frequency generated from the engine.

For example, when it is estimated that R is 6,000 revolution speed, "a" is 6, "d" is φ2 mm, E is 122,600, and ρ is 8,880, the length L of each of the coil terminals 6 and 7 is 41.6 mm or less.

From Expression 1 and Expression 2, L falls within a range of the following expression:

$$(5.28 \times 10^7 d((E/\rho)^{1/2})/Ran\pi)^{1/2} \geq L \geq ((3\pi dED(\alpha 1 - \alpha 2) \Delta T/10)^{1/2})/10$$

From the expression described above, L and d each fall within a range of the following expression:

$$(5.28 \times 10^7 ((E/\rho)^{1/2})/Ran\pi)^{1/2} \geq L/d^{1/2} \geq ((3\pi ED(\alpha 1 - \alpha 2) \Delta T/10)^{1/2})/10$$

For example, when it is estimated that E is 122,600, ρ is 8,880, α1 is $1.7 \times 10^{-5}$, α2 is $1.2 \times 10^{-5}$, ΔT is 100, D is 316, R is 6,000, n is 2, and a is 6, L and d each satisfy the following expression:

$$13.6 \leq L/d^{1/2} \leq 29.4$$

In the rotary electric machine described above, the length L of each of the coil terminals 6 and 7 is set so as to satisfy Expression 1. Therefore, the stress to be generated in the coil terminals 6 and 7 due to the difference in linear expansion coefficient between the stator core 1 and the bus bars 9 when the temperature rises can be reduced. For example, in the calculation example described above, the generated stress can be reduced to be smaller than or equal to the 0.2% proof stress of copper. In this manner, the stress to be generated in the connecting portions of the coil terminals 6 and 7 to the bus bars 9 due to the temperature rise caused under a poor thermal environment can be reduced.

Further, the length L of each of the coil terminals 6 and 7 is set so as to satisfy Expression 2 described above. Therefore, a resonance point of the coil terminals 6 and 7 can be kept higher than a principal vibration that is susceptible to an influence of the engine. Thus, a sufficient vibration resistance can be ensured.

Figure 6:
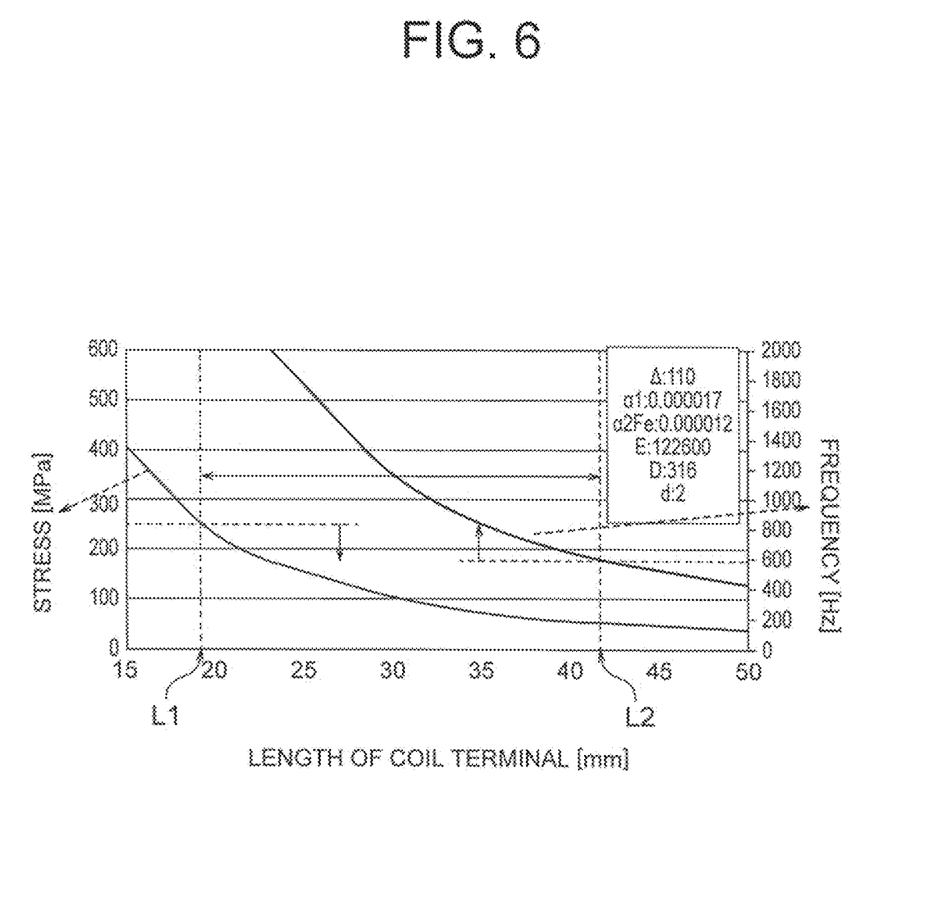
FIG. 6 is a graph for showing an example of a relationship between a length of a coil terminal, a generated stress, and a resonant frequency.

FIG. 6 is a graph for showing an example of a relationship between the length of the coil terminal, the generated stress, and the resonant frequency. In the first embodiment, the length L of each of the coil terminals 6 and 7 is set to be larger than or equal to L1 and smaller than or equal to L2 of FIG. 5. The length L1 is L when the stress generated in the beam is equal to 250 MPa. The length L2 is L when the resonant frequency f that is generated in the beam is equal to the vibration frequency to be generated from the engine. In this manner, the sufficient vibration resistance can be ensured while the generated stress in the coil terminals 6 and 7 is reduced.

For example, when a diameter of the overall rotary electric machine is increased and the diameter of the cross section of each of the coil wires is increased for application to a 48V-system, a coil stiffness and a displacement amount due to the thermal deformation are disadvantageously increased at the same time. In contrast, according to the configuration of the first embodiment, even when the diameter of the rotary electric machine is large and each of the coil wires is thick, the stress generated in the connecting portions of the coil terminals 6 and 7 to the bus bars 9 can be sufficiently reduced.

Further, all the first coil terminals 6 are arranged on the same axial side of the stator core 1, whereas all the second coil terminals 7 are arranged on the axial side of the stator core 1, which is opposite to the side on which the first coil terminals 6 are arranged. Therefore, there is no substance that interferes with a tool at the time of connection to the bus bars 9. Thus, workability is improved. Further, a sufficient space for first bent portions 13 and first linear portions 12 can be ensured.

Second Embodiment

Figure 7:
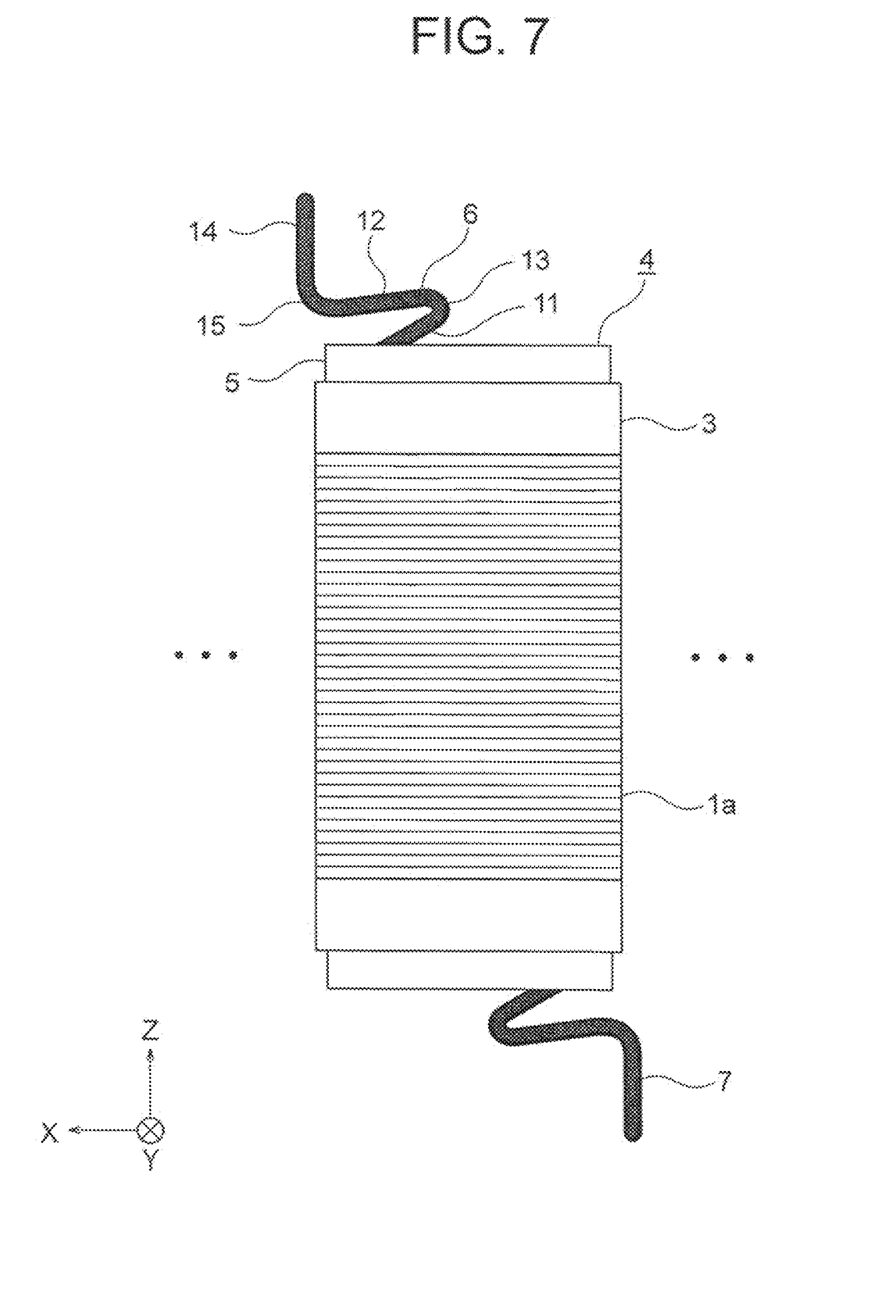
FIG. 7 is a front view when part of a stator of a rotary electric machine according to a second embodiment of the present invention is viewed outward from a radially inner side.
Figure 8:
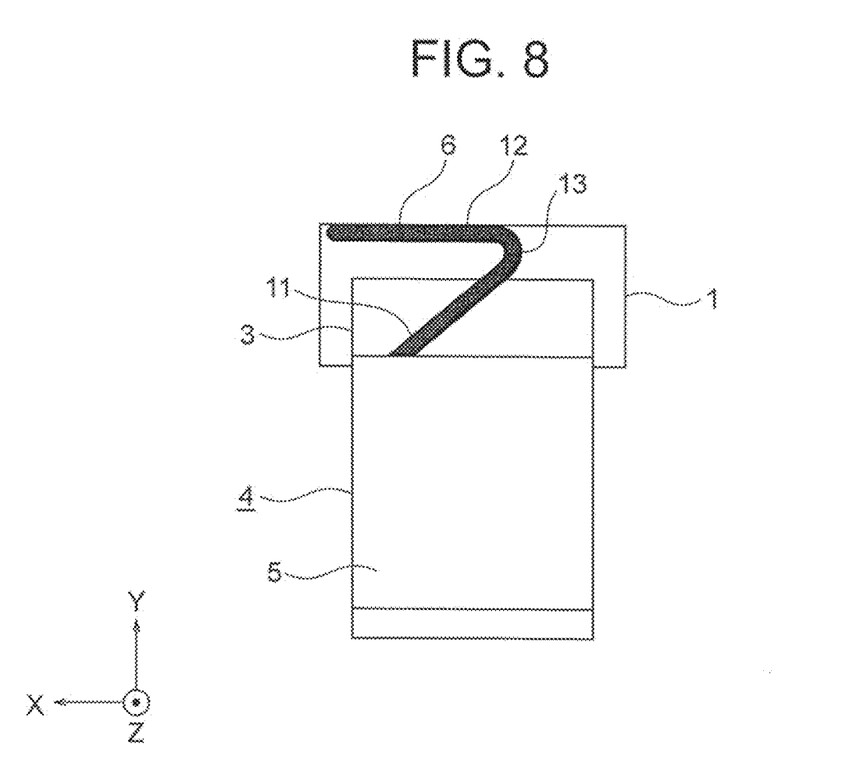
FIG. 8 is a plan view when part of the stator of FIG. 7 is viewed along the axial direction.
Figure 9:
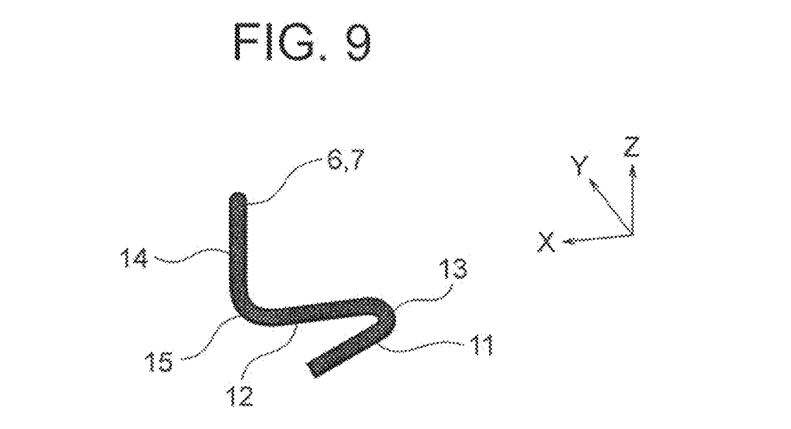
FIG. 9 is a perspective view for illustrating a shape of each of a first coil terminal and a second coil terminal of FIG. 7.

Next, FIG. 7 is a front view when part of a stator of a rotary electric machine according to a second embodiment of the present invention is viewed outward from a radially inner side, FIG. 8 is a plan view when part of the stator of FIG. 7 is viewed along the axial direction, and FIG. 9 is a perspective view for illustrating a shape of each of the first coil terminal 6 and the second coil terminal 7. Each of the coil terminals 6 and 7 has a lead-out portion 11, a first linear portion 12, a first bent portion 13, a second linear portion 14, and a second bent portion 15.

The lead-out portion 11 is formed to extend from an end on the coil main body 5 side toward the radially outer side of the stator core 1. The first linear portion 12 is formed along the circumferential direction of the stator core 1. The first bent portion 13 is formed between the lead-out portion 11 and the first linear portion 12.

The second linear portion 14 is formed along the axial direction of the stator core 1. The second bent portion 15 is formed between the first linear portion 12 and the second linear portion 14.

A length of the first linear portion 12 is 3 mm or more and 3 mm or less. A length of the second linear portion 14 is 10 mm or more and 15 mm or less. All other configurations are similar or identical to the first embodiment.

In the rotary electric machine described above, each of the coil terminals 6 and 7 includes the lead-out portion 11, the first linear portion 12, the first bent portion 13, the second linear portion 14, and the second bent portion 15. Therefore, each of the coil terminals 6 and 7 is in such a form as to be routed in a radial direction and the circumferential direction of the stator core 1. As a result, flexibility of the coil terminals 6 and 7 can be ensured multi-directionally. Thus, the stress that is generated in the connecting portions of the coil terminals 6 and 7 to the bus bars 9 due to the thermal deformation can be reduced.

Specifically, the stress that is generated in the connecting portion can be relaxed at the first linear portion 12 and the first bent portion 13 while each of the coil terminals 6 and 7 is prevented from expanding in the axial direction.

The diameter 13 of each of the bus bars 9 is set smaller than or equal to 316 mm, the diameter d of the cross section of the coil wire is set larger than or equal to 1.8 mm and smaller than or equal to 2.0 mm, the length of the first linear portion 12 is set larger than or equal to 3 mm and smaller than or equal to 5 mm, and the length of the second linear portion 14 is set larger than or equal to 10 mm and smaller than or equal to 15 mm. Therefore, a specific value of the coil terminals 6 and 7, that is, the resonant frequency with respect to the vibration of the engine can be kept high while the stress generated in the connecting portions of the coil terminals 6 and 7 to the bus bars 9 is relaxed.

Third Embodiment

Figure 10:
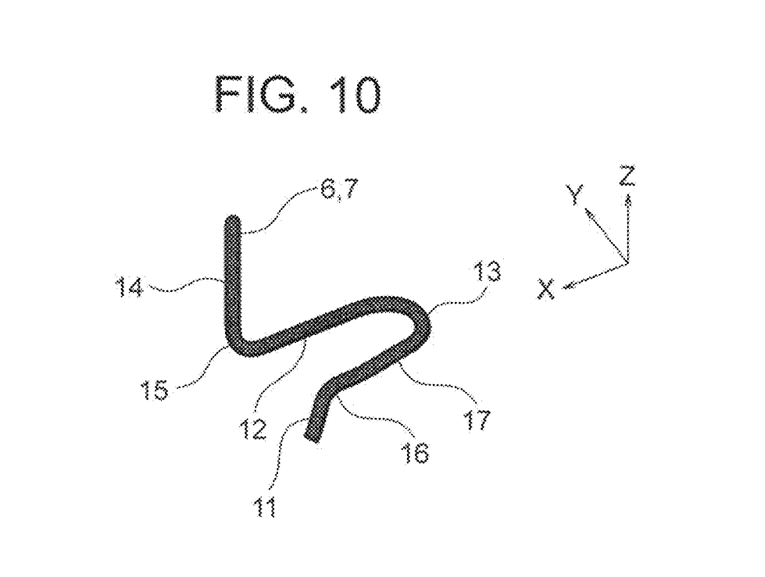
FIG. 10 is a perspective view for illustrating a shape of each of a first coil terminal and a second coil terminal of a rotary electric machine according to a third embodiment of the present invention.

Next, FIG. 10 is a perspective view for illustrating a shape of each of the first coil terminals 6 and the second coil terminals 7 of a rotary electric machine according to a third embodiment of the present invention. Each of the coil terminals 6 and 7 of the second embodiment further includes a third bent portion 16 and a third linear portion 17.

The third bent portion 16 is formed between the first bent portion 13 and the lead-out portion 11 and is bent in an orientation opposite to an orientation in which the first bent portion 13 is bent. The third linear portion 17 is formed between the third bent portion 16 and the first bent portion 13 along the circumferential direction of the stator core 1. All other configurations are similar or identical to the second embodiment.

In the rotary electric machine described above, the third bent portion 16 and the third linear portion 17 are additionally provided. Thus, each of the coil terminals 6 and 7 can be more flexible, and hence the stress generated in the connecting portions of the coil terminals 6 and 7 to the bus bars 9 can be further reduced.

Fourth Embodiment

Figure 11:
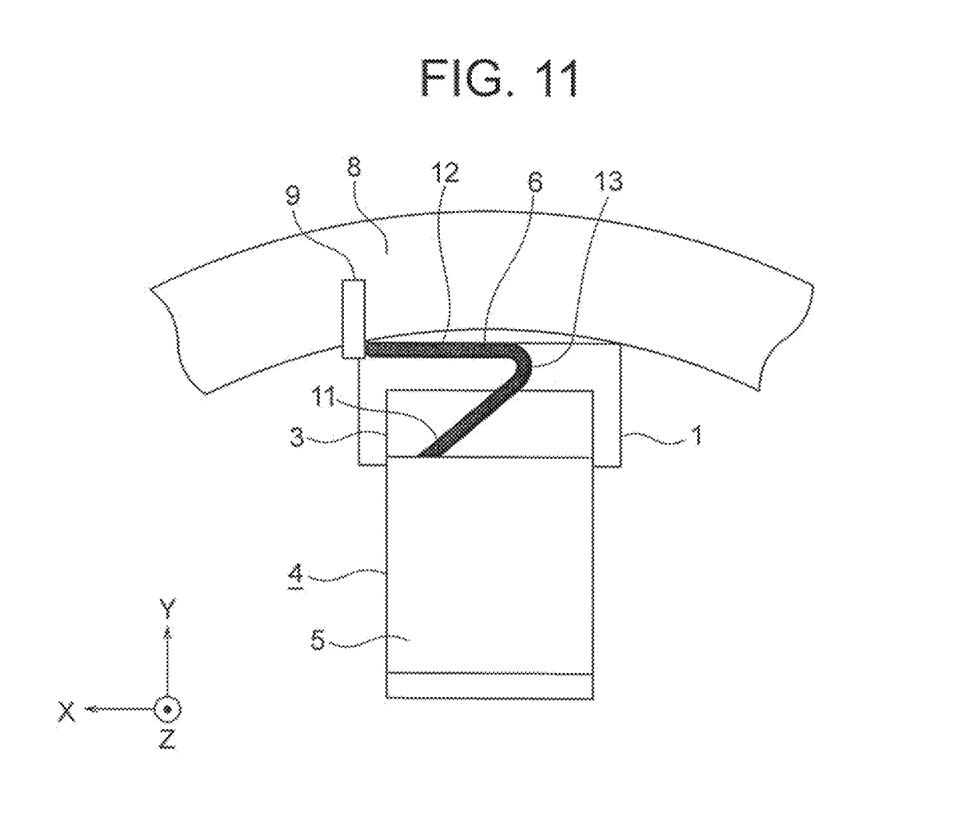
FIG. 11 is a plan view when part of a stator of a rotary electric machine according to a fourth embodiment of the present invention is viewed along the axial direction.

Next, FIG. 11 is a plan view when part of a stator of a rotary electric machine according to a fourth embodiment of the present invention is viewed along the axial direction. In the fourth embodiment, the first linear portion 12 is arranged between the insulator 3 and the holder 8. Specifically, at least part of the first linear portion 12 is located in a groove formed between the insulator 3 and the holder 8. All other configurations are similar or identical to the second embodiment or the third embodiment.

In the rotary electric machine described above, the first linear portion 12 is arranged between the insulator 3 and the holder 8, which are both made of insulating materials. Therefore, the coil terminals 6 and 7 can be prevented from expanding in the axial direction and the radial direction of the stator core 1, while an insulating property from peripheral components are more reliably ensured.

Fifth Embodiment

Figure 12:
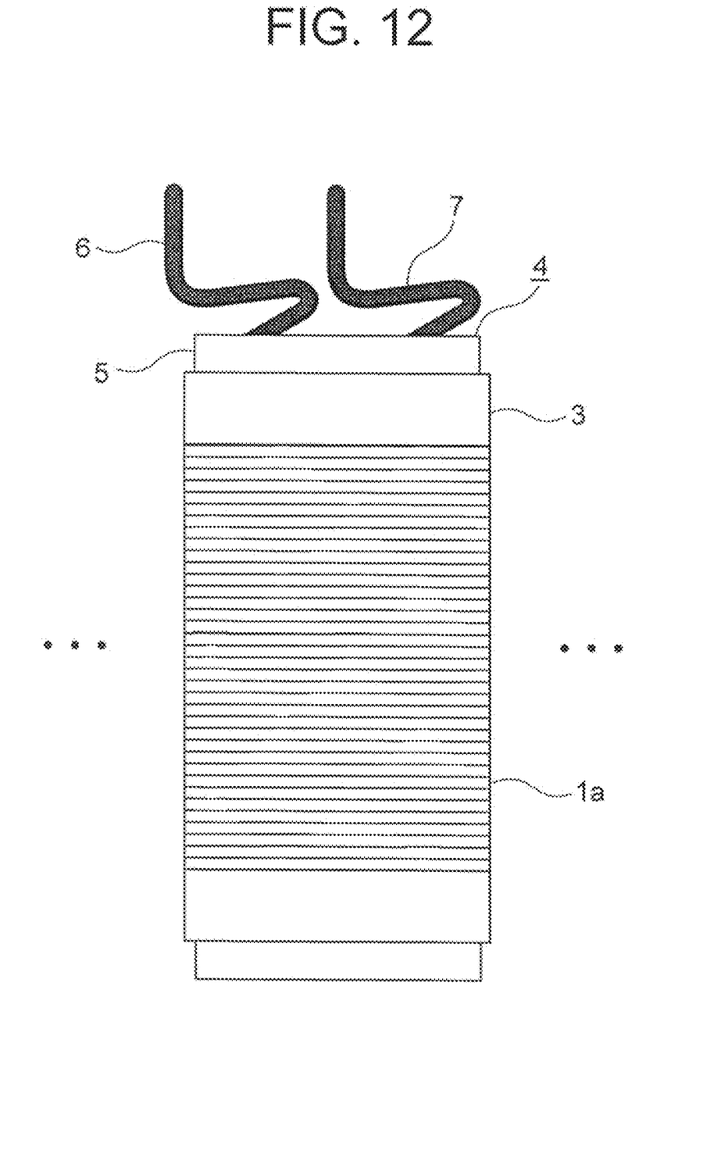
FIG. 12 is a front view when part of a stator of a rotary electric machine according to a fifth embodiment of the present invention is viewed outward from a radially inner side.

Next, FIG. 12 is a front view when part of a stator of a rotary electric machine according to a fifth embodiment of the present invention is viewed outward from a radially inner side. In the fifth embodiment, the first coil terminals 6 and the second coil terminals 7 of all the coils 4 are arranged on the same axial side of the stator core 1. All other configurations are similar or identical to the first embodiment, the second embodiment, the third embodiment, or the fourth embodiment.

In the rotary electric machine described above, the first coil terminals 6 and the second coil terminals 7 of all the coils 4 are arranged on the same axial side of the stator core 1. Therefore, an axial size of the overall rotary electric machine can be reduced.

Sixth Embodiment

Figure 13:
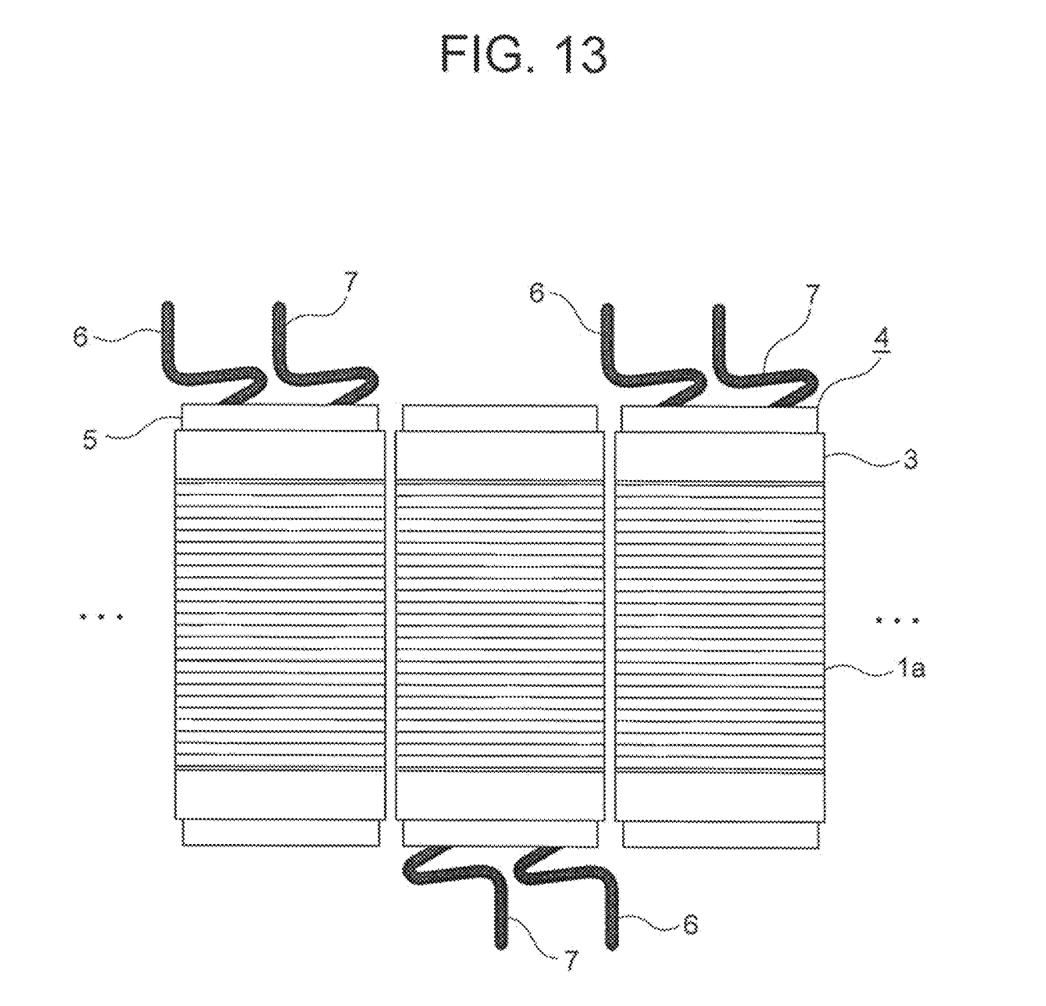
FIG. 13 is a front view when part of a stator of a rotary electric machine according to a sixth embodiment of the present invention is viewed outward from a radially inner side.

Next, FIG. 13 is a front view when part of a stator of a rotary electric machine according to a sixth embodiment of the present invention is viewed outward from a radially inner side. In the sixth embodiment, the first coil terminal 6 and the second coil terminal 7 of each of the coils 4 are arranged on the same axial side of the stator core 1. Further, the first coil terminal 6 and the second coil terminal 7 of the adjacent coil 4 are arranged on the opposite axial side of the stator core 1. All other configurations are similar or identical to the first embodiment, the second embodiment, the third embodiment, or the fourth embodiment.

In the rotary electric machine described above, the first coil terminal 6 and the second coil terminal 7 of the adjacent coil 4 are arranged on the opposite axial side of the stator core 1. Therefore, there is no substance that interferes with a tool at the time of connection to the bus bars 9, and hence workability is improved. Further, a sufficient space for the first bent portions 13 and the first linear portions 12 can be ensured.

The present invention is applicable to some of the coil terminals. When the present invention is applied to at least one coil terminal, the effects can be obtained in the at least one coil terminal.

The linear portions 12, 14, and 17 are not required to be perfectly linear.

Further, the present invention is also applicable to rotary electric machines other than the on-vehicle motor.

The invention claimed is:
1. A rotary electric machine, comprising:
a frame made of a metal material;
a stator core having a cylindrical shape, which is fixed to the frame, and has a plurality of teeth;
a plurality of insulators, which are made of an insulating material, and are provided to end surfaces of the stator core;
a plurality of coils, each being formed of a coil wire and including a coil main body provided around the tooth via the insulators and coil terminals led out from the coil main body;
a plurality of bus bars, which are made of a conductive material, and are provided along a circumferential direction of the stator core, and to which the coil terminals are connected; and
a holder, which is arranged on a radially outer side of the stator core with respect to the coil terminals, and is configured to hold the plurality of bus bars,
wherein, when a diameter of each of the plurality of bus bars is defined as D, a diameter of a cross section of each of the coil wires is defined as "d", a Young's modulus of the coil wires is defined as E, a linear expansion coefficient of the conductive material of the bus bars is defined as $\alpha 1$, a linear expansion coefficient of a material of the stator core is defined as $\alpha 2$, and an estimated temperature difference between a room temperature and a use environment temperature is defined as $\Delta T$, a length L of at least one of the coil terminals from an end on the coil main body side to a connecting portion to the bus bar satisfies the following expression:

$$L \geq ((3\pi d E D(\alpha 1 - \alpha 2)\Delta T/10)^{1/2})/10.$$

2. The rotary electric machine according to claim 1, wherein, when a density of each of the plurality of coils is defined as $\rho$, an estimated maximum revolution speed of an engine to be installed in a vicinity of the rotary electric machine is defined as R, a number of cylinders of the engine is defined as "a", and an order of a vibration mode that is estimated to appear when the rotary electric machine resonates with the engine is defined as "n", the length L of the at least one coil terminal from the end on the coil main body side to the connecting portion to the bus bar satisfies the following expression:

$$(5.3\times10^7 d((E/\varphi^{1/2})/Ra\pi)^{1/2} \geq L.$$

3. The rotary electric machine according to claim 2, wherein the length L and the diameter d satisfy the following expression:

$$13.6 \leq L/d^{1/2} \leq 29.4.$$

4. The rotary electric machine according to claim 2, wherein the diameter D of each of the plurality of bus bars falls within a range of from 290 mm to 316 mm, and the diameter "d" of the cross section of each of the coil wires falls within a range of from 1.7 mm to 2.0 mm.

5. The rotary electric machine according to claim 1,
wherein the coil terminals each include a first coil terminal and a second coil terminal,
wherein the first coil terminals of all the plurality of coils are arranged on the same axial side of the stator core, and
wherein the second coil terminals of all the plurality of coils are arranged opposite to the first coil terminals in an axial direction of the stator core.

6. The rotary electric machine according claim 1,
wherein the coil terminals each include a first coil terminal and a second coil terminal,
wherein the first coil terminals and the second coil terminals of all the plurality of coils are arranged on the same axial side of the stator core.

7. The rotary electric machine according to claim 1,
wherein the coil terminals each include a first coil terminal and a second coil terminal,
wherein the first coil terminal and the second coil terminal of each of the plurality of coils are arranged on the same axial side of the stator core, and
wherein the first coil terminals and the second coil terminals of the adjacent coils are arranged opposite to the axial side in an axial direction of the stator core.

8. A rotary electric machine, comprising:
a frame made of a metal material;
a stator core having a cylindrical shape, which is fixed to the frame, and has a plurality of teeth;
a plurality of insulators, which are made of an insulating material, and are provided to end surfaces of the stator core;
a plurality of coils, each being formed of a coil wire and including a coil main body provided around the tooth via the insulators and coil terminals led out from the coil main body;
a plurality of bus bars, which are made of a conductive material, are provided along a circumferential direction of the stator core, and to which the coil terminals are connected; and
a holder, which is arranged on a radially outer side of the stator core with respect to the coil terminals, and is configured to hold the plurality of bus bars,
wherein at least one of the coil terminals includes:
a lead-out portion formed to extend from an end of the at least one coil terminal on the coil main body side toward a radially outer side of the stator core;
a first linear portion formed along a circumferential direction of the stator core;
a first bent portion formed between the lead-out portion and the first linear portion;
a second linear portion formed along an axial direction of the stator core; and
a second bent portion formed between the first linear portion and the second linear portion.

9. The rotary electric machine according to claim 8, wherein the at least one coil terminal further includes:
a third bent portion, which is formed between the first bent portion and the lead-out portion, and is bent in a direction opposite to the bent direction of the first bent portion; and
a third linear portion formed between the third bent portion and the first bent portion along the circumferential direction of the stator core.

10. The rotary electric machine according to claim 8,
wherein a length of the first linear portion is 3 mm or more and 5 mm or less, and
wherein a length of the second linear portion is 10 mm or more and 15 mm or less.

11. The rotary electric machine according claim 8, wherein the first linear portion is arranged between the insulator and the holder.

12. The rotary electric machine according to claim 8,
wherein the coil terminals each include a first coil terminal and a second coil terminal,
wherein the first coil terminals of all the plurality of coils are arranged on the same axial side of the stator core, and
wherein the second coil terminals of all the plurality of coils are arranged opposite to the first coil terminals in an axial direction of the stator core.

13. The rotary electric machine according to claim 8,
wherein the coil terminals each include a first coil terminal and a second coil terminal,
wherein the first coil terminals and the second coil terminals of all the plurality of coils are arranged on the same axial side of the stator core.

14. The rotary electric machine according to claim 8,
wherein the coil terminals each include a first coil terminal and a second coil terminal,
wherein the first coil terminal and the second coil terminal of each of the plurality of coils are arranged on the same axial side of the stator core, and
wherein the first coil terminals and the second coil terminals of the adjacent coils are arranged opposite to the axial side in an axial direction of the stator core.

* * * * *